United States Patent
Watanabe

(10) Patent No.: US 8,422,862 B2
(45) Date of Patent: Apr. 16, 2013

(54) DATA RECORDING METHOD, DATA RECORDING APPARATUS AND DATA RECORDING MEDIUM

(75) Inventor: Akinobu Watanabe, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 203 days.

(21) Appl. No.: 12/908,151

(22) Filed: Oct. 20, 2010

(65) Prior Publication Data

US 2011/0097057 A1   Apr. 28, 2011

(30) Foreign Application Priority Data

Oct. 23, 2009   (JP) ................ 2009-243979

(51) Int. Cl.
*H04N 9/80*   (2006.01)

(52) U.S. Cl.
USPC .......................................................... 386/248

(58) Field of Classification Search .................. 386/248
See application file for complete search history.

(56) References Cited

U.S. PATENT DOCUMENTS

| | | | |
|---|---|---|---|
| 2007/0162817 A1 | 7/2007 | Hamada | |
| 2009/0129219 A1* | 5/2009 | Marumori | 369/47.1 |
| 2009/0189995 A1* | 7/2009 | Shimazaki et al. | 348/222.1 |
| 2010/0246361 A1* | 9/2010 | Miazzo et al. | 369/83 |

FOREIGN PATENT DOCUMENTS

| | | |
|---|---|---|
| JP | 2007-179671 | 7/2007 |
| JP | 2008-159233 | 7/2008 |

OTHER PUBLICATIONS

Blu-ray Disc Association. Mar. 2005, White Paper Blu-ray Disc Format 2.B Audio Visual Application Format Specifications for BD-ROM.

* cited by examiner

*Primary Examiner* — Thai Tran
*Assistant Examiner* — William Tran
(74) *Attorney, Agent, or Firm* — Antonelli, Terry, Stout & Kraus, LLP.

(57) ABSTRACT

In a data recording method, a data recording apparatus and a data recoding medium, for downloading plural numbers of contents, thereby to record them, additionally, onto a same recording medium, while maintaining the compatibility of reproduction with using an existing player, a maximum file number, which is already recoded on the recording medium, is noticed to a server, and thereby additional contents is downloaded after changing management information in such that the file numbers do not duplicate with each other.

6 Claims, 7 Drawing Sheets

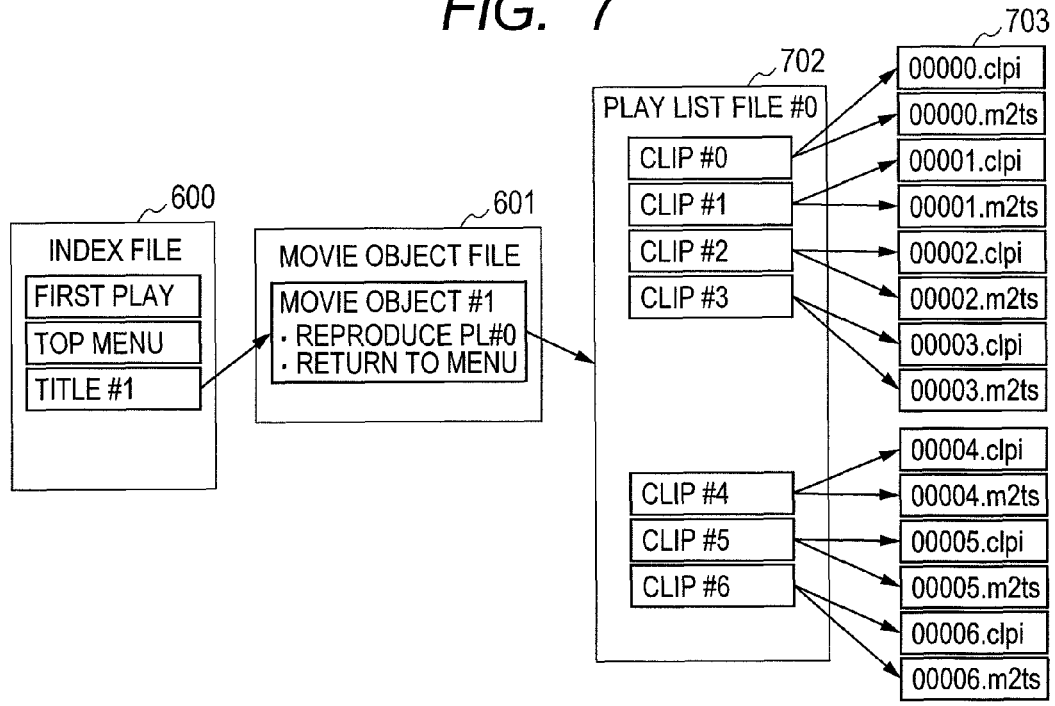
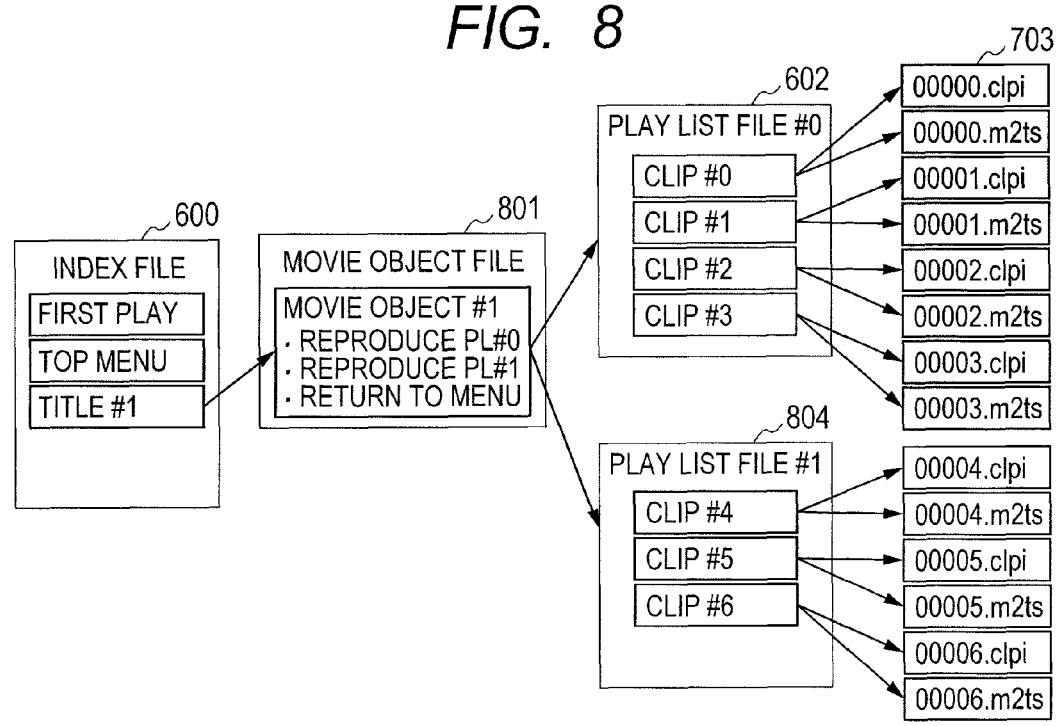

DATA RECORDING METHOD, DATA RECORDING APPARATUS AND DATA RECORDING MEDIUM

This application relates to and claims priority from Japanese Patent Application No. 2009-243979 filed on Oct. 23, 2010, the entire disclosure of which is incorporated herein by reference.

BACKGROUND OF THE INVENTION

The present invention relates to a data recording method, a data recording apparatus and a data recoding medium, and it relates, in particular, to the data recording method, the data recording apparatus and the data recording medium being suitable when executing download recording onto the recording medium.

A service of downloading AV contents from a server on the Internet on an optical disc, such as, a DVD (Digital Versatile Disc) or a BD (Blu-ray Disc, registered trademark), etc., is available. For example, with a DVD recorder or a personal computer software enabling "DVD Burning", which is provided KDDI Corp., it is possible to protect contents with using CPRM technology and to download them to be recorded on a recordable type DVD.

On the other hand, although downloading onto the BD is now on a stage of studying the standardization thereof, but through a method disclosed in the following Patent Document 1 (Japanese Patent Laying-Open No. 2008-159233), for example, it is possible to download plural numbers of contents, additionally, onto the recordable BD medium, such as, a BD-R or BD-RE, etc.

Also, a method for recording with a BDMV format, which is mainly applied in a BD-ROM, i.e., a recording medium for exclusive use of reproduction, onto the recordable BD medium, such as, the BD-R or BD-RE, etc., in the following Patent Document 2 (Japanese Patent Laying-Open No. 2007-179671).

With the BDMV format, each scene is divided, separately, into the files by a unit, being called a "clip", and as a rule of naming the clip, a sequence of five (5) digits of integers is used (Non-Patent Document 1).

For example, there can be considered the structure that AV contents of a movie, being constructed with 10 pieces of scenes, is made up with 10 pieces of stream files, e.g., from 00000.M2TS to 00009.M2TS.

<Prior Art Documents>
<Patent Documents>

[Patent Document 1] Japanese Patent Laying-Open No. 2008-159233 (2008); and

[Patent Document 2] Japanese Patent Laying-Open No. 2007-179671 (2007).

<Non-Patent Documents>

[Non-Patent Document 1] White Paper Blu-ray Disc Format 2.B Audio Visual Application Format Specifications for BD-ROM March 2005.

BRIEF SUMMARY OF THE INVENTION

In case when downloading the plural numbers of contents onto one (1) piece of disc, there can be considered a several method for achieving that.

For example, the followings can be considered: e.g., a method of downloading one (1) piece of contents into one (1) partition while dividing plural numbers of partitions, and a method of storing one (1) piece of contents into a subfolder while producing plural numbers of subfolders.

However, there is a problem that any one of those cannot be reproduced by existing BD players, which are already spread on the market, i.e., having the structure of non-compatible with. Then, there is a demand of lowering down a cost of renewal of firmware of the existing players, if possible, by maintaining the compatibility with the conventional BD players.

In such case, there must be the structures of one (1) volume, one (1) partition, and also the same folder structure, which are defined in the existing BD standard or regulation.

According to the conventional BD standard, within each of the contents, although it is so regulated that a unique file number, from 00000 to 99999, is assigned to each clip (=a set of the AV stream file and the management information thereof) one by one, thereby to identify the clip; however, there is no regulation of the way of assigning the file number between the different contents, and then, there occurs a problem, inherently, that the file numbers are duplicated, in particular, when trying to manage the different contents as one (1) piece of contents, collectively.

For example, incase of BD contents available on the market, it is now assumed that a certain movie company "A" uses the file numbers from the clip 00000 to 00050 in BD (1), and also it uses the file numbers from the clip 00000 to 00040 in other BD (2). And, it is also assumed that another company "B" uses the file numbers from the clip 00000 to 00080 in BD (3) thereof. In such case, the file numbers from 00000 to 00040 or 00000 to 00050 are duplicated with.

There is no problem when dealing them as the separated recording media, but in the case when managing those contents on one (1) piece of the recording medium, a problem occurs, and this is also same when executing the download recording.

In particular, since the download recording has a problem of taking a long time for downloading, it is suitable for the contents relatively small in the data volume thereof, such as, the contents of a short film or series drama, etc., and it is highly demanded to additionally record those on one (1) piece of the recording medium.

Therefore, in order to execute the download recording of plural numbers of contents on one (1) piece of disc, while keeping the compatibility with the conventional BD players, it is necessary to avoid the duplication of the file numbers of the clips between the contents.

According to the present invention, the problems mentioned above are dissolved by such the structures, as are defined or described in the pending claims, for example.

In more details thereof, for example, a maximum file number, which was already recorded on a recording medium, or a maximum play list number is informed to a server, and contents are downloaded, the file names or the like of which are renewed in such manner that the file numbers and/or the play list numbers do not duplicate with each other, and thereby recoding them on the recording medium.

According to the present invention, it is possible to execute the download recording of the plural numbers of contents, appropriately, on one (1) piece of disc, while maintaining the compatibility with the conventional BD players.

BRIEF DESCRIPTION OF THE DRAWINGS

Those and other objects, features and advantages of the present invention will become more readily apparent from the following detailed description when taken in conjunction with the accompanying drawings wherein:

FIG. 7 is the structural view of logical data after executing the downloading, and in particular, a part 1 thereof;

FIG. 8 is the structural view of the logical data after executing the downloading, and in particular, a part 2 thereof;

DETAILED DESCRIPTION OF THE PREFERRED EMBODIMENTS

Hereinafter, embodiments according to the present invention will be fully explained by referring to the attached drawings.

Figure 1:
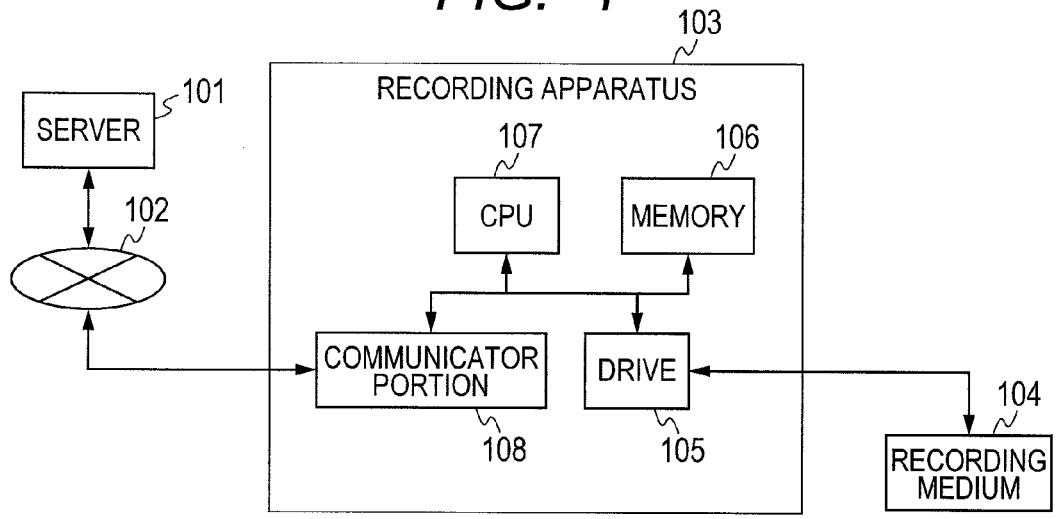
FIG. 1 is a view for showing the configurations of a server, a recorder and a disc, according to an embodiment of the present invention.

FIG. 1 is a view for showing the structure of the present invention.

A reference numeral 101 depicts a server, storing contents to be downloaded therein. It is, for example, a contents server for exclusive use thereof, which is provided by a movie company. There can be considered a case where it provides the contents of BDMV format.

A reference numeral 102 depicts a network, with which the server 101 and a recording apparatus 103. For example, it is the Internet (World Wide Web).

A reference numeral 103 depicts the recording apparatus, onto which contents are downloaded and recorded. For example, a BD recorder having a built-in BD drive therein can be applied. Other than that, there can be considered the configuration of a personal computer having a built-in or an external BD drive or a SDHC card writer, or a kiosk terminal for an exclusive use of download sale, which is provided in public facilities, such as, a station, etc., or a DVD/BD rental shop or a convenience store.

A reference numeral 104 depicts a recording medium, onto which the contents downloaded are recorded. For example, a rewritable BD-RE can be applied as it, among the Blu-ray Discs. Other than that, it is also possible to apply a SDHC card using a semiconductor memory as the recording medium or an iVDR mounting a copyright protection circuit on a HDD (Hard Disc Drive) coating a magnetic material on a metal disc, as that.

A reference numeral 105 depicts a drive for recording or reproducing the contents onto/from the recording medium 104. For example, a BD drive recordable on the BD-RE can be applied as that. Other than that, depending on the recording medium, it is possible to apply the SDHC card or an iVDR adopter.

A reference numeral 106 depicts a memory for storing the contents to be recorded on the recording medium 104 by the drive 105, temporarily. For example, a SD-RAM can be applied as that. Other than that, it is possible to utilize a part of the HDD, which is built within the recording apparatus.

A reference numeral 107 depicts a CPU, which controls the processes for downloading the contents through a communicator portion 108 and controls the drive 105 so that it records the contents downloaded on the recording medium 104 through the memory 106. There can be considered that configuration that the CPU has the memory 106 built-in. Or, a SoC (System on Chip), integrating other portions as an IC, can be also considered.

A reference numeral 108 depicts the communicator part, which accesses to the server 101 through the Internet so as to download the contents therefrom. For example, it is possible to use a network chip, integrating network communication functions as an IC. Other than that, it is also possible to apply an Ether Net® cart as that.

Figure 2:
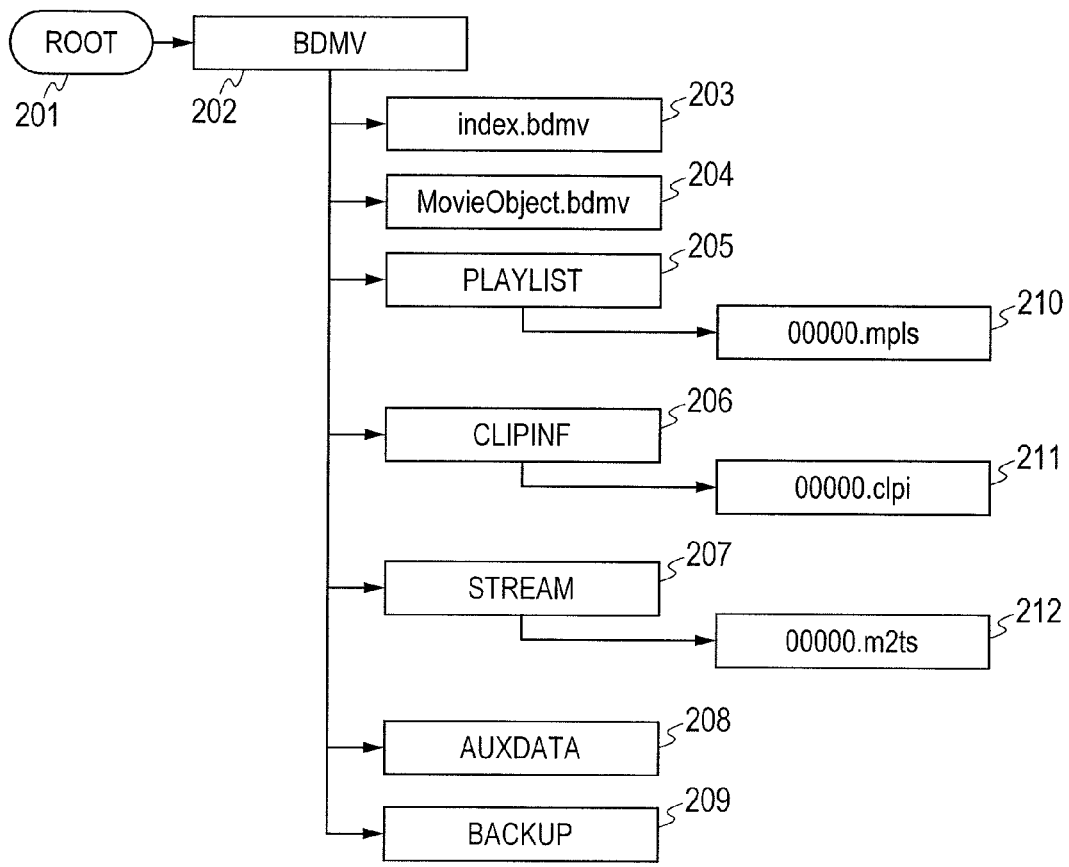
FIG. 2 is the structural view of an original folder/file of BDMV format.

FIG. 2 shows the folder structure and a file structure of the recording medium, according to a first embodiment of the present invention. This shows the structure of BDMV format, as one of the BD regulations.

A reference numeral 201 depicts a root folder at the most significant, in which all of the data are included below the root folder or below a sub-folder.

A reference numeral 202 depicts a BDMV folder, below which a sub-folder and/or a file defined by the BDMV regulation are stored.

A reference numeral 203 depicts an index folder for storing therein the information of the contents as a whole, which are contained in the recording medium.

A reference numeral 204 depicts a movie object file for storing therein the information, such as, a reproduction sequence, etc.

A reference numeral 205 depicts a play list folder for storing therein a play list, which defines an order or sequence of reproduction of scenes.

A reference numeral 206 depicts a clip information folder for storing therein a clip file, which stores the information of AV stream files.

A reference numeral 207 depicts a stream folder for storing therein the AV stream file itself.

A reference numeral 208 depicts an external data folder for storing therein data, such as, font data added, for example.

A reference numeral 209 depicts a backup folder for storing therein a copy of the index file 203, the movie object file 204, the play list folder 205, the clip information folder 206, a play list file 210, or a play-clip file 211. The copy has the file name and the folder name, which are same to those of an origin of the copy.

A reference numeral 210 depicts the play list file, defining the order or sequence of reproduction of the scenes.

A reference numeral 211 depicts the clip information file for storing therein the information of the AV stream file(s).

A reference numeral 212 depicts the AV stream file, being a file of the stream data, which is encoded with the MPEG2-TS format.

File extensions of the play list file 210, the clip information file 211 and the AV stream file 212 are MPLS, CLPI and M2TS, respectively.

Also, a file name of the play list file 210 is an integer from 00000 to 99999. Also, a file name of the clip information file 211 or the AV stream file 212 is an integer from 00000 to 99999, and this is also a file number thereof. And, the clip information file and the AV stream file makes up one (1) piece of clip, in the form of a pair.

Figure 3:
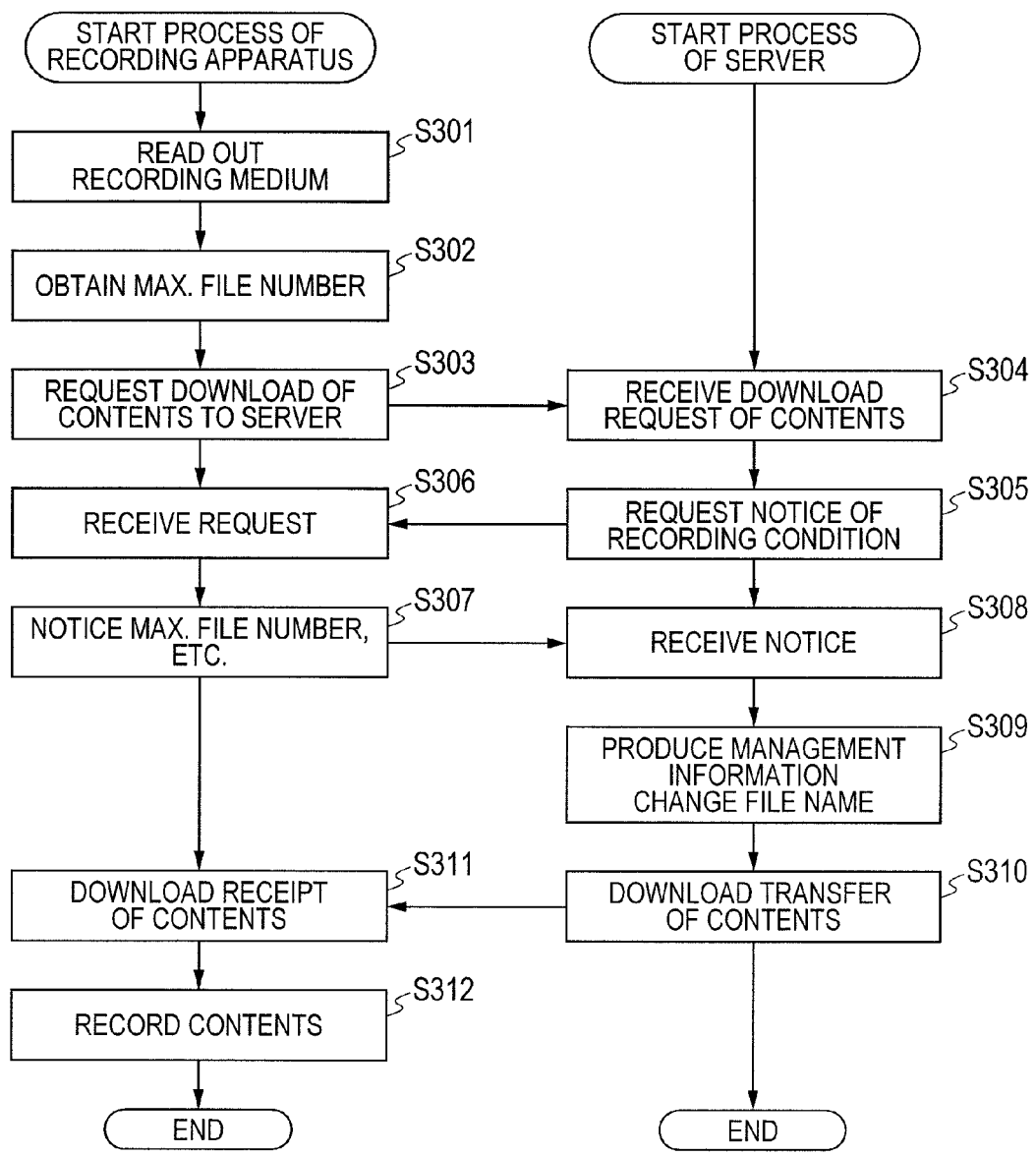
FIG. 3 is a flowchart of processing when executing the download recording.

FIG. 3 is a view for showing a flow of downloading process executed within the recording apparatus 103 and the server 101, according to the present embodiment.

First of all, when the recording medium 104 is inserted into the recording apparatus 103, the CPU 107 issues an instruction to access to the recording medium 104 within the recording apparatus 103, and upon receipt of this, the drive 105 reads out the information from the recording medium 104, which is recorded thereon (S301). The information to be read out at this instance includes: ID information or MKB (Medium Key Block) information of the recording medium, and the information, such as, an index file and a movie object, etc.

Next, sorting is made upon the files within a STREAM folder or a CLIPINF folder by a file name, and thereby obtaining the largest or the maximum file number (S302).

Then, a request is made to the server 101 for downloading the contents (S303).

The server receiving of the download request (S304) makes a request to the recording apparatus to send the logical recording condition of the recording medium, the clip information file and/or the maximum file number, which is used as the file name of the AV file stream, and/or the information recorded in a management information file, such as, the play list file, the movie object file and the index file, etc. (S305), and the recording apparatus upon receipt of that request (S306) informs the maximum file number, etc., which is obtained in S302 to the server (S307).

The server receiving the information of the recording condition (S308) executes the processes for producing the management information and/or for changing the file name of each file, upon basis of the information of recording condition, such as, the maximum file number received (S309). Thereafter, the server starts the downloading of the contents (S310), and the recording apparatus receives the contents downloaded (S311), thereby recording thereof on the recording medium (S312).

In this manner, when executing the downloading, the maximum value (hereinafter, being called, "maximum first file number") among common file numbers (being called, "first numbers") of each of the file names of M2TS files and CLPI files is informed to the recording apparatus, and the M2TS files and the CLPI files, the filenames of which are renewed upon the maximum first file number mentioned above, are downloaded from the server mentioned above. Also, the above-mentioned file names of the M2TS files and the CLPI files to be downloaded from the server are renewed upon basis of the file numbers, being larger than the maximum first file number. In this manner, it is possible to avoid duplication of the file number, and thereby to execute the download recording, appropriately.

However, within the step S302, other than the method for obtaining the maximum file number through the sorting method, with providing a field for recording the maximum file number(s) therein, in a management file, such as, the play list file and the index file, etc., thereby reading out the maximum file number from that field before addition recording, as a substitution process for the step S302, it is possible to achieve a secondary effect, i.e., lightening load of the sorting process, and achieving the desired object, as well.

In this instance, as an occasion for issuing the download request may be a method, such as, a user may select the downloading, among a menu displayed on a screen of a display monitor, which is connected with the recording apparatus, or the downloading process may start when a program recorded on the recording medium is executed during an auto-executable process when loading.

<Notice of Maximum Number of Play List>

Figure 6:
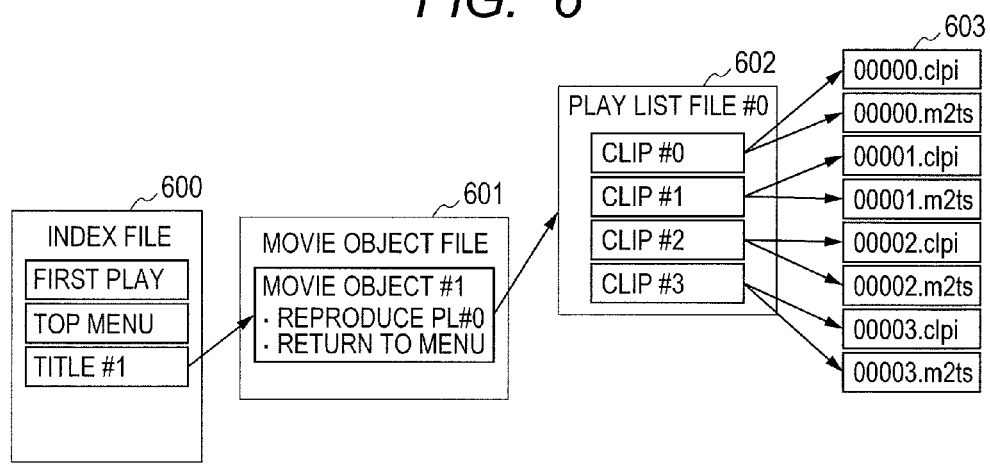
FIG. 6 is the structural view of logical data before executing the downloading.

Also, as is shown in FIGS. 6 and 8, which will be mentioned later, there may be generated a necessity of noticing the maximum value, about the file number of the play list file (i.e., the MPLS file), as the file number to be noticed to the server, other than the file number of clips (i.e., the file numbers of the CLPI file and the M2TS file). Namely, it is a case when additionally recording the play list file on the recording medium, newly, or the like.

In this case, with informing also the maximum value of the file number of the play list, in addition to the maximum value of the file number of the clip, it is possible to dissolve the problem, such as, the duplication of numbers of play list files, in a similar manner to that of the case of the clip file.

By taking FIGS. 6 and 8 as an example, only one (1) of a play list file 602 is recorded before executing the downloading (FIG. 6), and the number thereof is "#0". Therefore, at the same time when noticing the maximum value of the number of the clip files, or at a timing before or after thereof, with noticing the maximum value (e.g., "#0") of the number of the play list files, on a side of the server, it is possible to set the number of the play list files 804 to be downloaded, to be the number obtained by adding "1" to the noticed number ("#0").

<Notice of Maximum Number of Movie Object>

Figure 9:
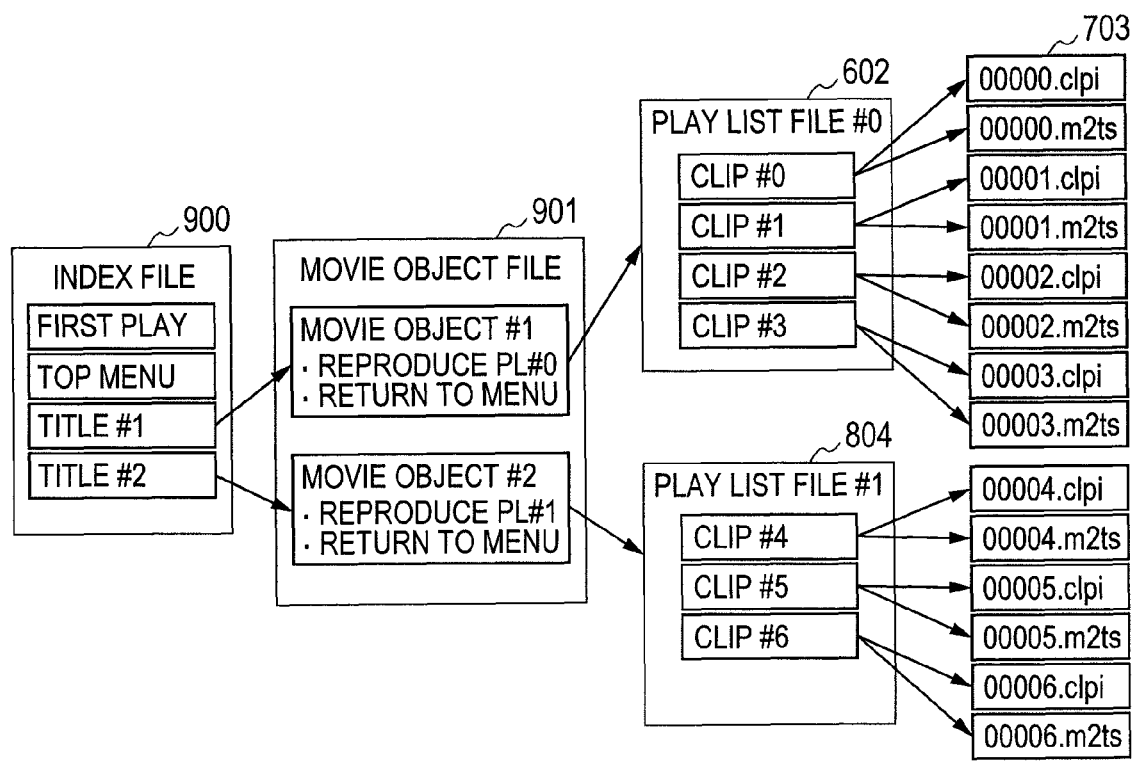
FIG. 9 is the structural view of the logical data after executing the downloading, and in particular, a part 3 thereof.

Further, as is shown in FIGS. 6 and 9, which will be mentioned later, as the information to be noticed to the server, also about the information of the movie object, there may be a case of generating the necessity of noticing thereof. Thus, it is the case where the contents to be downloaded is recorded on the recording medium, additionally, as a title independent from the title, which was already recorded on the recording medium.

In this case, in addition to the maximum value of the file number of clicks and the maximum value of the file number of play lists, with noticing the maximum value of the movie object number and the maximum number of the title, it is possible to dissolve the problems, such as, the duplication of the movie object numbers, and/or the duplication of the title numbers, etc., in the similar manner to the case of the clip files.

Taking FIGS. 6 and 9 as an example, before downloading, only a movie object #1 is recorded in a movie object file 601, and only a title #1 is recorded in the index file 600. Accordingly, at the same time when noticing the maximum value of the clip file number, or at a timing before or after thereof, with noticing the maximum value (#1) of the movie object number and the maximum value (#1) of the title number, on the side of the server, it is possible to set the number of the movie object to be added into the movie object file 901, to be the number (#2) obtained by adding "1" to the noticed number (#1) noticed.

<Notice Maximum Number for Each Kind of Movie Object>

Further, as an object to be included in the movie object file, there can be considered, not only the movie object, but also a case of including a BD-J object, which will be mentioned later, or a case of including only the BD-J object therein; however, is such case, with noticing the maximum value of the object number for each kind thereof, there can be obtained an effect of enabling to designate the object number of the title to be downloaded, correctly.

Thus, in case where the title to be downloaded is the movie object, then it is enough to set the value, obtained by adding "1" to the maximum number of the movie object number noticed, to the object number, or in case where the title to be downloaded is the BD-J object, it is enough to set the value, obtained by adding "1" to the maximum number of the BD-J object number noticed, to the object number.

<Transmission of Management File as a Whole>

By the way, also if taking the cases where it is necessary to notice plural numbers of information, such as, not only the maximum value of the file number of clips, but also the maximum value of the file number of the play list files and the movie object, the number of the BD-J object, for example, into the consideration, there can be considered the following construction for noticing the information.

Thus, not noticing the maximum value, but it may be a method for transmitting all of the description contents of the management file, such as, the play list file, the movie object file, and/or the index file, etc., to the server, for example.

With this, since an amount of volume of data to be transferred to the server come to be large, comparing to the case of transmitting only the maximum values, it has a demerit that much more times are necessary for transmission thereof; however, since it is possible to neglect the process for extracting the maximum value(s) on the recorder side, there can be obtained an effect of lightening the process of the recorder, and an effect of reducing the cost for implementing that process, etc.

Figure 4:
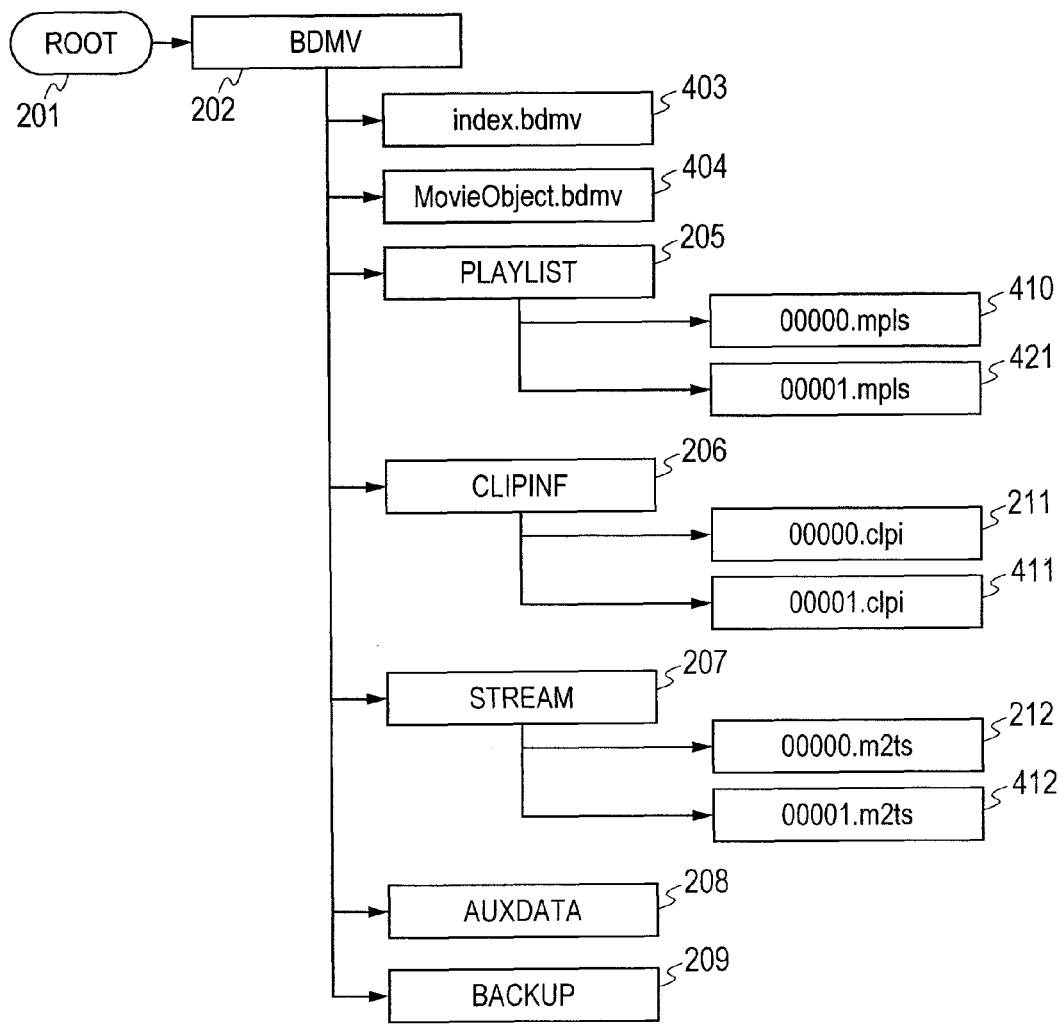
FIG. 4 is the structural view of the folder/file after executing the download recording.

FIG. 4 is a view for showing the folder structure and the file structure of the recording medium, after the download recording, according to the present embodiment.

Thus, this shows the case where the contents downloaded are recorded, additionally, onto the recording medium having the structure shown in FIG. 2. Explanation of the component(s) attached with the same reference numeral(s) is/are omitted herein.

Changes are made in the following aspects, comparing to those shown in FIG. 2:

(1) An index file 403 is renewed;
(2) A movie object file 404 is renewed;
(3) A play list file 421 is added;
(4) A play list file 410 is renewed;
(5) A clip information file is added;
(6) An AV stream file 412 is added; and
(7) Files corresponding to (1) to (5) mentioned above, among the management files below the backup folder, are renewed or added.

Other than those (1) to (7) mentioned above, no change is made thereon. Therefore, with renewing or adding only files, which are necessary and at the minimum, it is possible to achieve the desired object.

In particular, with no necessity of changing the clip information file and/or the AV stream file, which are recorded in advance, it is possible to suppress an amount or volume of change processes or change data to be less; therefore being effective for shortening the processing time.

Further, in an example shown in FIG. 7, which will be shown later, since those (1) and (2) mentioned above are not necessary, and also, in an example shown in FIG. 8, which will be mentioned later, since the (1) mentioned above is not necessary; therefore, there can be achieve an effect of lessening parts or portions to be changed.

Figure 5:
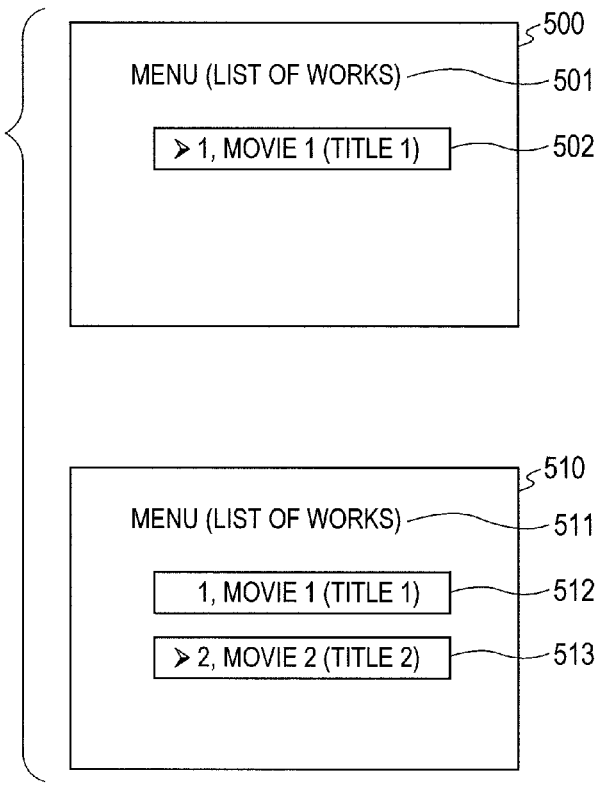
FIG. 5 a view of a menu when reproducing.

FIG. 5 is a view for showing that the title can be selected by the means of a menu, as a reproduction process within the conventional BD player.

A reference numeral 500 depicts a menu screen before executing the downloading. A reference numeral 501 depicts a list of titles (e.g., works), which are included in the recording medium, and 502 depicts an icon indicating that "movie 1" is included therein, as a fist title. The title, which can be selected on the menu screen 500 before downloading, is only 205, and the icon 502 is in the condition of being selected by a cursor.

A reference numeral depicts a menu screen after executing the downloading. A reference numeral 511 depicts a list of the titles (i.e., works), which are included in the recording medium, and 512 depicts an icon indicating that "movie 1" is included therein, as a fist title. A reference numeral 513 depicts an icon indicating that "movie 2" is included as the second title.

The titles, which can be selected on the menu screen 51 after the downloading, are only two (2), i.e., 501 and 502, and it is the condition where the icon 513 is selected.

When determining the selection of the icon, on the menu screen, command(s), which is/are described on the movie object corresponding thereto, are executed, and a play list is reproduced, which is indicated or instructed by a reproduction command.

FIG. 6 is a view for showing logical data structures of the recording medium before the downloading.

A reference numeral 600 depicts an index file, including the information, such as, a first play title and/or a top menu title, which are included in the recording medium, and others about a general title, therein. For example, there is included the information, such as, which one is the movie object corresponding to the title #1, etc.

A reference numeral 601 depicts a movie object file #0, and it includes one (1) or plural numbers of movie object information therein. For example, there is included the information of a movie object #1, which is referred from a title #1, and therein are described such a command, "reproduce a play list #0" or "return to a menu after reproduction", for example.

A reference numeral 602 depicts a play list file #0, and it includes one (1) or plural numbers clip information, building up the play list. For example, the play list #0, to be reproduced by a movie object #1, is built up with four (4) pieces of clips, from a clip #0 to a clip #3.

A reference numeral 603 depicts a file group corresponding to the clip, and in which are listed up the CLPI files and the M2TS files, each having the file name, from 00000 to 00003. For example, a clip #0 indicates both, a "00000.CLPI" file and a "00000.M2TS" file. The CLPI file and the M2TS file are stored in a CLPI folder and a STREAM folder, respectively.

As was shown in the above, within the recording medium before downloading are included four (4) pieces of clips, from 00000 to 00003 by the file numbers thereof, and one (1) piece of play list 00000 by the play list number.

As operations when reproducing, when reproduction of the title #1 is indicated, then according to the command described in the movie object #1, the play list #0 is reproduced. In other words, reproduction is made in the order, i.e., the clip #0, the clip #1, the clip #2 and the clip #3, and thereafter, a menu is displayed, in the operations thereof.

Hereinafter, three (3) ways examples of the logical data structures of the recording data after the download recording, by referring to FIGS. 7, 8 and 9.

FIG. 7 shows a first example of the logical data structure of the recording data after the download recording. Explanation of those attached with the same reference numerals will be omitted herein.

Thought relating to FIG. 3 mentioned above and also FIG. 10, which will be mentioned later, but when executing the downloading, from the recording apparatus to the server is noticed the maximum value (as was mentioned previously, the maximum first file number. In FIG. 7, it corresponds to "0003", at the maximum among the file numbers recorded on the disc (shown in FIG. 6) before downloading) among the file numbers, being common between the respective file names of the M2TS file and the CLPI file (as was mentioned previously, it is the first file number. In FIG. 7, it corresponds to "0000", which is common between the file name "0000.clpi" of the CLIP file and the file name "0000.m2ts" of the M2TS file), and the M2TS file and the CLPI file, the file names of which are renewed upon basis of the maximum first file number mentioned above (corresponding to "0004.clpi" to "0006.clpi" and "0004.m2ts" to "0006.m2ts", in FIG. 7), are downloaded from the server mentioned above. Also, the file names of the M2TS file and the CLPI file to be downloaded from the server are renewed upon basis of the file number, being larger than the maximum first file number mentioned above.

A reference numeral 702 depicts a play list file #0, and an aspect of changing from 602 lies in that the clip #6 is added after the clip #3 from the clip #4. Accordingly, when the play list #0 is reproduced by the command, which is described in the movie object #1, then seven (7) pieces of clips, from the clip #0 to the clip #6, are reproduced, one by one.

A reference numeral 703 depicts a file group corresponding to the clip, and in which are listed up the CLPI files and the M2TS files, each having the file name, from "00000" to "00006". An aspect of changing from 603 lies in that there are added the CLPI files and the M2TS files having the file names, from "00004" to "00006".

From the above, since the change is made only on the play list file 702 and can be suppressed to that of only addition of a file of the clip 703, but without generating the changes in the index file 600 and the movie object file 601, changing processes can be lightened within the server, and an amount of volume of network transmission is also reduced, and then there can be achieved an effect of shortening the time necessary for the downloading.

FIG. 8 shows a second example of the logical data structure of the recording medium after the download recording. Explanation of those attached with the same reference numerals will be omitted herein.

A reference numeral 801 depicts a movie object file, and an aspect of changing lies in that a command for reproducing the play list #1 is added thereto.

A reference numeral 804 depicts a play list file #1, and it is constructed with the clips from #4 to #6. Therefore, when the play list #1 is reproduced by the command, which is described in the movie object #1, three (3) pieces of clips from #4 to #6 are reproduced, one by one.

Although relating to FIG. 3 mentioned above and also FIG. 10, which will be mentioned later, but when executing the downloading, from the recording apparatus to the server is noticed the maximum value (being assumed a maximum second file number. In FIG. 8, it corresponds to "#0" at the maximum among the file numbers, which are recorded on the disc (shown in FIG. 6) before downloading) among the filenames of the MPLS files (being assumed the second file number. In FIG. 8, it corresponds to the file name "#0" or "#1" of the MPLS file), and then the MPLS file, the file name of which is renewed upon basis of the file number larger than the maximum second file number mentioned above, is downloaded from the server mentioned above, thereby to be recorded on the recording medium mentioned above (corresponding to the "play list file #1" in FIG. 8).

From the above, since the change is made only on the movie object file 801 and can be suppressed to that of only addition of the play list file 804, but without generating the changes in the index file 600 and the play list file 602, changing processes can be lightened within the server, and an amount of volume of network transmission is also reduced, therefore there can be achieved an effect of shortening the time necessary for the downloading.

Also, transmission size for noticing the recording condition to be noticed in the step S307 is limited to the maximum file number and the information of the movie object file, there can be expected an effect of reducing a volume of network transmission, further. This is effective, in particular, in case where the size of the play list file is large.

In this manner, as the file number to be noticed to the server, with noticing the maximum value thereof, about the file number of the play list file (i.e., the MPLS file), other than the file numbers of the clips (i.e., the file numbers of the CLPI file and the M2TS file), it is possible to deal with a case when recoding the play list file, additionally on the recording medium, newly. In this case, with noticing also the maximum value of the file numbers of the play lists, in addition to the maximum value of the file numbers of the clips, it is possible to dissolve a problem, i.e., the duplication of the numbers of the play list files, in the similar manner to that of the case of the clip files.

By taking FIGS. 6 and 8 as an example, only one (1), i.e., the play list file 602 is recorded (FIG. 6) before downloading, and that number is #0. Accordingly, with noticing the maximum value (#0) of the number of the play list files, at the same time when noticing the maximum value of the clip file numbers, or at the timing before or after thereof, on the server side, it is possible to set the number of the play list file 804 to be downloaded, to the number (#1) obtained by adding "1" to the number (#0) noticed.

FIG. 9 shows a third example of the logical data structure of the recording medium after executing the download recording. Explanation of those attached with the same reference numerals in FIGS. 6, 7 and 8 will be omitted herein.

A reference numeral 900 depicts an index file, and an aspect of changing from 600 lies in that a title #2 is added thereto.

Although relating to FIG. 3 mentioned above and also FIG. 10, which will be mentioned later, but when executing the downloading, from the recording apparatus to the server is noticed the maximum value (being assumed a maximum third file number. In FIG. 9, it corresponds to "#1" at the maximum among the title information manes, which are recorded on the disc (shown in FIG. 6) before downloading) among the title information names of the title information (being assumed the third file number. In FIG. 9, it corresponds to the title information name "#1" or "#2" of the title information), and then the title information, the title information names of which is renewed upon basis of the file number larger than the maximum third file number mentioned above, is downloaded from the server mentioned above, thereby to be recorded on the recording medium mentioned above (corresponding to the "title #2" in FIG. 9).

From the above, since the change is made only on the index file 900 and the movie object file, and it can be suppressed to those of only addition of the play list file 804 and the file of the clip 703, but without generating the changes in the play list file 602, changing processes can be lightened within the server, and an amount of volume of network transmission is also reduced, therefore there can be achieved an effect of shortening the time necessary for the downloading.

Also, since the title #1 and the title #2 are independent from, logically, in the data structures thereof, since no change is necessary on the data structure of the title #1, when adding the title #2 thereto, there can be obtained an effect of reducing a risk of affecting ill influences upon the operation of reproducing the title #1. In particular, in case where the title #1 already recorded and the title #2 to be recorded additionally are those, which are provided by different movie companies, etc., for example, since there are cases where the movie objects differ from each other in a method or kind of description (in case of BD-J object, which will be mentioned later), it is difficult to describe them, collectively, as one (1) piece of movie object, and the present method is suitable for it. Other than that, in case it is high in the independency as the title, then the present method would be effective, since it hardly receives the influences from the title already recorded.

Figure 10:
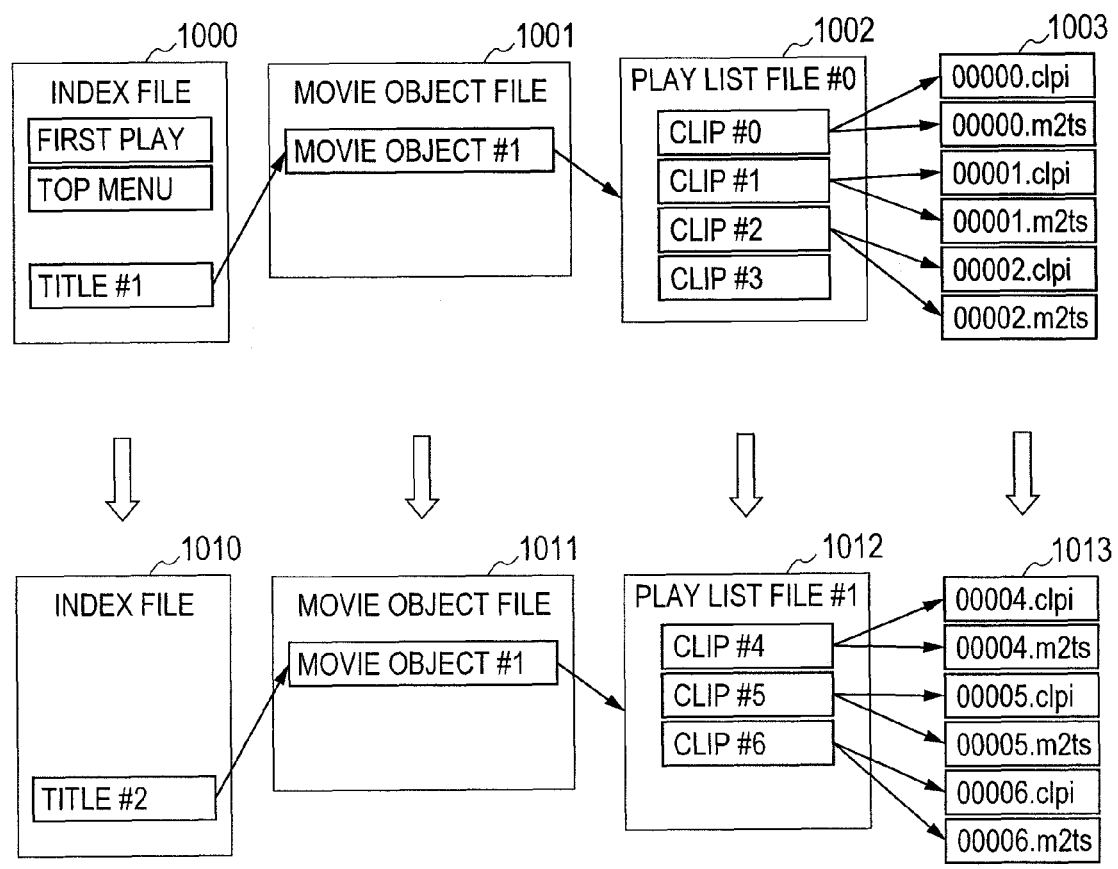
FIG. 10 is a block view of production of management information in the server.

Next, FIG. 10 is a view for explaining production of the management information file and change of the file name on the server, which are executed in the step 309 shown in FIG. 3.

This FIG. 10 explains an example of processes necessary for executing the download recording onto the recording medium before downloading shown in FIG. 7, and for building up such structure as shown in FIG. 9.

What is shown in an upper half of FIG. 10 is the condition of the contents to be downloaded, before the changing thereof, and under this condition, it has the structure as one (1) pieces of volume, which can be sold as a BD package or reproduced.

What is shown in a lower half of FIG. 10 is the condition of adding the changes for achieving the structure shown in FIG. 9. By adding making merging and adding those files to the file group shown in FIG. 7, it is possible to bring them into the condition shown in FIG. 9.

A reference numeral 1000 depicts an index file, including the title #1 therein.

A reference numeral 1001 depicts a movie object file, including the movie object #1.

A reference numeral 1002 depicts a play list file #0, being constructed with the clips #0, #1 and #2.

A reference numeral 1003 depicts a clip group, being constructed with the CLPI files and the M2TS files having the file numbers from "00000" to "00002".

Since the file numbers (from "00000" to "00002") of the clip group shown in FIG. 10 is duplicated with the file numbers (from "00000" to "00002") of the clip group shown in FIG. 7, collision of the file name is generated, when executing the download recording without changing the file name, and this brings about a problem of an overwriting, etc.

Therefore, for avoiding such duplication of the file names, it is effective to change the file name on the server side, by noticing such maximum file number as shown in FIG. 3, and accompanying with that, to change the file number described within the play list file.

Also, since also the file names of the play list files are duplicated with, it is possible to avoid a problem of duplication of the file names, in the similar manner, by changing the number of the play list file from "00000" (shown by "0" in the figure, conveniently) to "00001" (shown by "1" in the figure, conveniently), and by changing the description of the movie object, in addition thereto.

However, there are two (2) kinds, a HDMV object and a BD-J object, as the movie objects, and the above-mentioned is explained in the HDMV object.

In case of the BD-J object, there is the BD-J object in the place of the movie object, within the movie object file, and by executing a JAR file (not shown in the figure), which stores a JAVA (R) program in the place of the command, a necessary play list file is called up, and a series of clips are reproduced, one by one.

Accordingly, the processes to be executed when downloading, differing from the case of the HDMV, are the change process of the movie object file, and the addition of the JAR file, and with this, it is also possible to obtain the effect obtainable according to the present invention, similarly, even in the case of the BD-J object.

In FIG. 2, though only one (1) is shown for each of the files having the file number "00000", for simplification, but the contents of long time recording, such as, a movie, for example, is constructed with plural numbers of scenes divided, in many cases, and there are many examples of authoring, e.g., assigning each scene to each of the files; however, even in the case where N pieces of files are stored, for example, the similar effect can be applied, by downloading the files after N+1$^{th}$ and adding them thereto.

In the similar manner, when downloading plural numbers of contents, collectively, it is possible to obtain the similar effect if executing the process similar to that mentioned above, on each contents.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A recording method, for executing download recording of video/audio data onto a recording medium, wherein
    said recording medium has: folder structure of a hierarchical structure;
    a STREAM folder for holding a M2TS file, recording the video/audio data therein;
    a CLIPINF folder for holding a CLPI file, recording management information therein; and
    a PLAYLIST folder for holding a MPLS file, recording reproduction information therein, wherein
    a file name of said M2TS file comes to be a first file number,
    a file name of said CLIPINF folder comes to be a second file number,
    said first file number and said second file number correspond to 1:1, to be a common file number,
    a file number of said MPLS file comes to be a third file number, and having
    a movie object file, describing an order of reproduction therein, wherein
    in said MPLS file, the reproduction information is described by said common file number,
    in said movie object file, the order of reproduction is described by said third file number, and in the method for recording onto the recording medium having such conditions, comprising the following steps of:
    noticing a maximum file number having a maximum value, among said file numbers, to a content transfer server; and
    downloading the MPLS file of a file name of a fourth file number of a value larger than said maximum file number, and the movie object file, in which the reproduction information is described by said fourth file number, from the content transfer server, thereby recording them.

2. The recoding method, as described in the claim 1, wherein
    the file names of said M2TS file and said CLPI file, which are downloaded from said server are renewed upon basis of a file number larger than said maximum first file number.

3. The recoding method, as described in the claim 2, wherein
    in said folder structure is further included a PLAYLIST folder for storing the MPLS file recording the reproduction information therein,
    the file name of said MPLS file is described upon basis of the second file number,
    when executing said download, from said recording apparatus to said server is noticed a maximum second file number, being a maximum value among said second file numbers, and
    the MPLS file, the file name of which is renewed upon basis of the file number larger than said maximum second file number, is downloaded from said server, thereby recoding it on said recoding medium.

4. A recording apparatus, for executing download recording of video/audio data onto a recording medium, wherein
said recording medium has: folder structure of a hierarchical structure;
a STREAM folder for holding a M2TS file, recording the video/audio data therein;
a CLIPINF folder for holding a CLPI file, recording management information therein; and
a PLAYLIST folder for holding a MPLS file, recording reproduction information therein, wherein
a file name of said M2TS file comes to be a first file number,
a file name of said CLIPINF folder comes to be a second file number,
said first file number and said second file number correspond to 1:1, to be a common file number,
a file number of said MPLS file comes to be a third file number, and having
a movie object file, describing an order of reproduction therein, wherein
in said MPLS file, the reproduction information is described by said common file number,
in said movie object file, the order of reproduction is described by said third file number, and in the recording apparatus for recording onto the recording medium having such conditions, wherein
a maximum file number having a maximum value, among said file numbers is noticed, to a content transfer server; and
the MPLS file of a file name of a fourth file number of a value larger than said maximum file number, and the movie object file, in which the reproduction information is described by said fourth file number, are downloaded from the content transfer server, thereby to record them;
wherein at least one of the recited files and folders are effected, at least in part, by a hardware processor.

5. A non-transitory medium for executing download recording of video/audio data thereon, wherein
said recording medium has: folder structure of a hierarchical structure;
a STREAM folder for holding a M2TS file, recording the video/audio data therein;
a CLIPINF folder for holding a CLPI file, recording management information therein; and
a PLAYLIST folder for holding a MPLS file, recording reproduction information therein, wherein
a file name of said M2TS file comes to be a first file number,
a file name of said CLIPINF folder comes to be a second file number,
said first file number and said second file number correspond to 1:1, to be a common file number,
a file number of said MPLS file comes to be a third file number, and having
a movie object file, describing an order of reproduction therein, wherein
in said MPLS file, the reproduction information is described by said common file number,
in said movie object file, the order of reproduction is described by said third file number, and in the recording medium having such conditions, wherein
a maximum file number having a maximum value, among said file numbers is noticed, to a content transfer server; and
the MPLS file of a file name of a fourth file number of a value larger than said maximum file number, and the movie object file, in which the reproduction information is described by said fourth file number, are downloaded from the content transfer server, thereby to record them.

6. A recoding method for downloading video/audio data from a server down to a recording apparatus, thereby recoding onto a recording medium, wherein
obtaining folder structure of a hierarchical structure by said recording medium;
in said folder structure are included
storing in a STREAM folder a M2TS file, recording the video/audio data therein, and holding in a CLIPINF folder a CLPI file, recording management information therein,
said M2TS file and said CLPI file build up one (1) piece of clip in a pair thereof, and a file name of each one of the M2TS file and the CLPI file, building up said one (1) piece of clip, are described upon basis of a first file number, being a common file number,
when executing said download, from said recording apparatus to said server is noticed a maximum first file number, being a maximum value among said first file numbers, and
the M2TS file and the CLPI file, the file names of which are renewed upon basis of said maximum first number, are downloaded from said server, thereby recoding them on said recording medium.

* * * * *